(12) United States Patent
Song

(10) Patent No.: US 10,509,265 B2
(45) Date of Patent: Dec. 17, 2019

(54) PHOTO-ALIGNMENT APPARATUS AND PHOTO-ALIGNMENT METHOD

(71) Applicant: Shenzhen China Star Optoelectronics Technology Co., Ltd., Shenzhen (CN)

(72) Inventor: Yanjun Song, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 59 days.

(21) Appl. No.: 15/545,323

(22) PCT Filed: May 19, 2017

(86) PCT No.: PCT/CN2017/085176
§ 371 (c)(1),
(2) Date: Jul. 21, 2017

(87) PCT Pub. No.: WO2018/188163
PCT Pub. Date: Oct. 18, 2018

(65) Prior Publication Data
US 2018/0292716 A1     Oct. 11, 2018

(30) Foreign Application Priority Data
Apr. 10, 2017 (CN) .......................... 2017 1 0229345

(51) Int. Cl.
*G02F 1/1337* (2006.01)
(52) U.S. Cl.
CPC ................. *G02F 1/133788* (2013.01)

(58) Field of Classification Search
CPC .................... G02F 1/1337; G02F 1/133788
(Continued)

(56) References Cited

U.S. PATENT DOCUMENTS 7,244,627 B2 * 7/2007 Lee .................. G02F 1/133784
                                                  438/29
2003/0043461 A1    3/2003 Delpico
(Continued)

FOREIGN PATENT DOCUMENTS

CN     1591143 A     3/2005
CN   102445788 A     5/2012
(Continued)

*Primary Examiner* — Charles S Chang
(74) *Attorney, Agent, or Firm* — Leong C. Lei

(57) ABSTRACT

The invention provides a photo-alignment apparatus and a photo-alignment method. In photo-alignment apparatus, a movable polarizing element is disposed between loading platform and light source; when the LC panel to be aligned uses display mode of horizontal alignment, moving the polarizing element to below light source to convert non-polarized light emitted from light source into linearly polarized light to irradiate on the LC panel to be aligned to perform alignment; when the LC panel to be aligned uses display mode of vertical alignment, moving the polarizing element to a region outside of below light source, so that the non-polarized light emitted from light source irradiating on the LC panel to be aligned to perform alignment. As such, the present invention can be applied to horizontal alignment and vertical alignment respectively, improve the usability of the photo-alignment apparatus, reduce the manufacturing cost, save space and reduce management load.

13 Claims, 2 Drawing Sheets

(58) Field of Classification Search
USPC .................................................. 349/123–124
See application file for complete search history.

(56) References Cited

U.S. PATENT DOCUMENTS

| | | | | |
|---|---|---|---|---|
| 2007/0153184 | A1* | 7/2007 | Ham ................. | G02F 1/133784 |
| | | | | 349/126 |
| 2012/0293763 | A1* | 11/2012 | Inoue ................ | G02F 1/133788 |
| | | | | 349/178 |
| 2013/0265532 | A1* | 10/2013 | Kim .................. | G02F 1/133753 |
| | | | | 349/124 |
| 2014/0227929 | A1* | 8/2014 | Miyachi ............ | G02F 1/133788 |
| | | | | 445/24 |
| 2018/0275465 | A1* | 9/2018 | Shimoshikiryoh .......................... | |
| | | | | G02F 1/133528 |

FOREIGN PATENT DOCUMENTS

| | | |
|---|---|---|
| CN | 103869547 A | 6/2014 |
| CN | 104765199 A | 7/2015 |
| CN | 105474002 A | 4/2016 |
| CN | 106019721 A | 10/2016 |

\* cited by examiner

PHOTO-ALIGNMENT APPARATUS AND PHOTO-ALIGNMENT METHOD

BACKGROUND OF THE INVENTION

1. Field of the Invention

The present invention relates to the field of display, and in particular to a liquid crystal display (LCD) pixel driver circuit and thin film transistor (TFT) substrate.

2. The Related Arts

As display technology progresses, the liquid crystal display (LCD) shows the advantages of high display quality, low power-consumption, thinness, and wide applications, the LCD is widely used in various devices, such as, liquid crystal TV, mobile phones, PDA, digital camera, PC monitors or notebook PC screens, becomes the leading display technology.

The majority of the LCDs on the market are backlit LCDs, which comprise an LCD panel and a backlight module. The operation principle for LCD panel is to dispose liquid crystal (LC) molecules between two parallel glass substrate, with a plurality of vertical and horizontal tiny wires between the two glass substrates, and change the directions of the LC molecules by applying electricity or not to deflect the light from the backlight module to generate an image. In general, an LCD panel comprises a color filter (CF) substrate, a thin film transistor (TFT) substrate, a liquid crystal (LC) sandwiched between the CF substrate and the TFT substrate, and a sealant.

In an LCD alignment process, a different photo-alignment method is needed for a different display mode of the LCD, and different alignment equipment must be used. For example, polymer stabilized vertically aligned (PSVA) type LCD panels requires a process to perform vertical alignment to the LC, and the corresponding equipment is a UV exposure machine, wherein the light emitted from the UV exposure machine is non-polarized light. On the other hand, the In-Plane Switching (IPS) type LCD panel or Fringe Field Switch (FFS) type LCD requires a process to perform horizontal alignment to the LC, and the corresponding equipment is a rubbing machine or a photo-alignment machine, wherein the light emitted from photo-alignment machine is linearly polarized light. For a manufacturer to invest in PSVA and IPS technologies, the existing technology requires the manufacturer to purchase two different types of equipments, which increases the cost, operation space and management load.

SUMMARY OF THE INVENTION

The object of the present invention is to provide a photo-alignment apparatus, able to provide linearly polarized light and non-polarized light, to be applied to horizontal alignment and vertical alignment respectively, improve the usability of the photo-alignment apparatus, reduce the manufacturing cost, save space and reduce management load.

Another object of the present invention is to provide a photo-alignment method, able to perform horizontal alignment and vertical alignment during an LCD alignment process, improve the usability of the photo-alignment apparatus, reduce the manufacturing cost, save space and reduce management load.

To achieve the above object, the present invention provides a photo-alignment apparatus, comprising: a loading platform, a light source located above the loading platform, and a movable polarizing element located between the loading platform and the light source; a side of the loading platform facing the light source being for placing a liquid crystal (LC) panel to be aligned;

the polarizing element being movable to a region below the light source or otherwise in accordance with the display mode of the LC panel, and being for converting the non-polarized light emitted from the light source into linearly polarized light when moving to a region below the light source.

According to a preferred embodiment of the present invention, the polarizing element comprises a plurality of stacked glass plates, normal direction of the glass plates forms a Brewster angle with propagation direction of the non-polarized light emitted from the light source.

According to a preferred embodiment of the present invention, the number of glass plates is between three and ten.

According to a preferred embodiment of the present invention, the photo-alignment apparatus further comprises a filter, disposed between the light source and the polarizing element, and below the light source.

According to a preferred embodiment of the present invention, the non-polarized light emitted from the light source has a wavelength of 200-800 nm.

The present invention further provides a photo-alignment method, comprising the steps of:

Step S1: providing a photo-alignment apparatus, the photo-alignment apparatus comprising: a loading platform, a light source located above the loading platform, and a movable polarizing element located between the loading platform and the light source;

Step S2: placing a liquid crystal (LC) panel to be aligned on a side of the loading platform facing the light source;

Step S3: moving the polarizing element to a region below the light source or otherwise in accordance with the display mode of the LC panel, and performing photo-alignment on the LC panel to be aligned.

According to a preferred embodiment of the present invention, specifically, Step S3 comprises:

when the LC panel to be aligned uses display mode of horizontal alignment, moving the polarizing element to below the light source, and performing photo-alignment to the LC panel to be aligned;

when the LC panel to be aligned uses display mode of vertical alignment, moving the polarizing element to a region outside of below the light source, and performing photo-alignment to the LC panel to be aligned.

According to a preferred embodiment of the present invention, the polarizing element comprises a plurality of stacked glass plates, normal direction of the glass plates forms a Brewster angle with propagation direction of the non-polarized light emitted from the light source.

According to a preferred embodiment of the present invention, the number of glass plates is between three and ten.

According to a preferred embodiment of the present invention, the photo-alignment apparatus further comprises a filter, disposed between the light source and the polarizing element, and below the light source; and the non-polarized light emitted from the light source has a wavelength of 200-800 nm.

The present invention further provides a photo-alignment apparatus, comprising: a loading platform, a light source located above the loading platform, and a movable polarizing element located between the loading platform and the light source; a side of the loading platform facing the light source being for placing a liquid crystal (LC) panel to be aligned;

the polarizing element being movable to a region below the light source or otherwise in accordance with the display mode of the LC panel, and being for converting the non-polarized light emitted from the light source into linearly polarized light when moving to a region below the light source;

wherein the polarizing element comprising a plurality of stacked glass plates, normal direction of the glass plates forming a Brewster angle with propagation direction of the non-polarized light emitted from the light source;

wherein further comprising a filter, disposed between the light source and the polarizing element, and below the light source.

Compared to the known techniques, the present invention provides the following advantages: in the photo-alignment apparatus of the present invention, a movable polarizing element is disposed between the loading platform and the light source; when the LC panel to be aligned uses display mode of horizontal alignment, moving the polarizing element to below the light source to convert non-polarized light emitted from the light source into linearly polarized light to irradiate on the LC panel to be aligned to perform alignment; when the LC panel to be aligned uses display mode of vertical alignment, moving the polarizing element to a region outside of below the light source, so that the non-polarized light emitted from the light source irradiating on the LC panel to be aligned to perform alignment. As such, the present invention can be applied to horizontal alignment and vertical alignment respectively, improve the usability of the photo-alignment apparatus, reduce the manufacturing cost, save space and reduce management load. The present invention also provides a photo-alignment method, able to perform horizontal alignment and vertical alignment during an LCD alignment process, improve the usability of the photo-alignment apparatus, reduce the manufacturing cost, save space and reduce management load.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
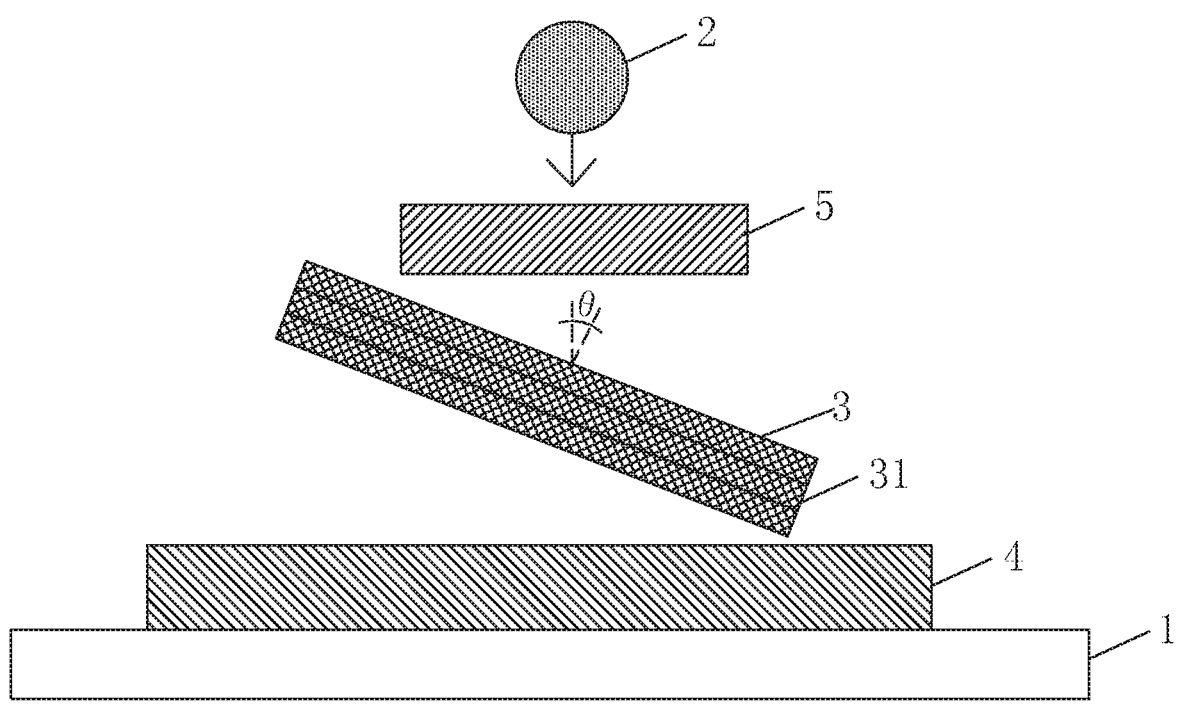
FIG. 1 is a schematic view showing the structure of an photo-alignment apparatus according to the present invention.

Refer to FIG. 1, the present invention provides a photo-alignment apparatus, comprising: a loading platform 1, a light source 2 located above the loading platform 1, and a movable polarizing element 3 located between the loading platform 1 and the light source 3; a side of the loading platform 1 facing the light source 2 being for placing a liquid crystal (LC) panel 4 to be aligned;

the polarizing element 3 being movable to a region below the light source 2 or otherwise in accordance with the display mode of the LC panel 4, and being for converting the non-polarized light emitted from the light source 2 into linearly polarized light when moving to a region below the light source 2.

It should be noted that, in the photo-alignment apparatus of the present invention, a movable polarizing element 3 is disposed between the loading platform 1 and the light source 2; when the LC panel 4 to be aligned uses display mode of vertical alignment for the LC molecules, such as, PSVA, moving the polarizing element 3 to a region outside of below the light source 2, so that the non-polarized light emitted from the light source 2 irradiating directly on the LC panel 4 to be aligned to perform vertical alignment; when the LC panel 4 to be aligned uses display mode of horizontal alignment for LC molecules, such as, IPS or FFS, moving the polarizing element 3 to below the light source 2 to convert non-polarized light emitted from the light source 2 into linearly polarized light to irradiate on the LC panel 4 to be aligned to perform horizontal alignment. As such, the present invention can be applied to horizontal alignment and vertical alignment respectively, improve the usability of the photo-alignment apparatus, reduce the manufacturing cost, save space and reduce management load.

Specifically, the polarizing element 3 comprises a plurality of stacked glass plates 31, normal direction of the glass plates 31 forms a Brewster angle $\theta$ with propagation direction of the non-polarized light emitted from the light source 2.

Preferably, the number of glass plates is between three and ten.

Specifically, the photo-alignment apparatus further comprises a filter 5, disposed between the light source 2 and the polarizing element 3, and below the light source 2 for adjusting the wavelength of the non-polarized light emitted from the light source 2.

Specifically, the non-polarized light emitted from the light source 2 has a wavelength of 200-800 nm.

Preferably, the non-polarized light emitted from the light source 2 is UV light.

Specifically, when performing photo-alignment on the LC panel 4 to be aligned, the loading platform 1 can perform heating to the LC panel 4 to be aligned, with the temperature between 25° C.-60° C., to accelerate the photo-alignment efficiency.

Specifically, when performing photo-alignment on the LC panel 4 to be aligned, the loading platform 1 can move the LC panel 4 to be aligned horizontally for a complete alignment of the LC molecules. The loading platform moves at a speed in accordance with the amount of light emitted from the light source 2.

Figure 2:
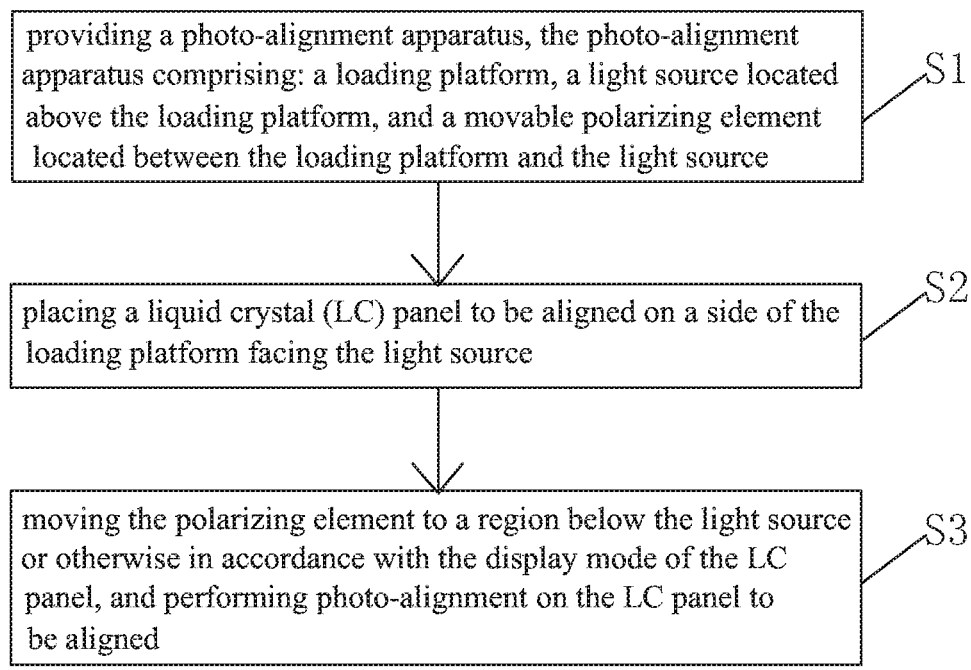
FIG. 2 is a schematic view showing the flowchart of an photo-alignment method according to the present invention.

Refer to FIG. 2. Based on the aforementioned photo-alignment apparatus, the present invention also provides a photo-alignment method, comprising the following steps of:

Step S1: providing a photo-alignment apparatus, the photo-alignment apparatus comprising: a loading platform 1, a light source 2 located above the loading platform 1, and a movable polarizing element 3 located between the loading platform 1 and the light source 2.

Specifically, the polarizing element 3 comprises a plurality of stacked glass plates 31, normal direction of the glass plates 31 forms a Brewster angle θ with propagation direction of the non-polarized light emitted from the light source 2.

Preferably, the number of glass plates is between three and ten.

Specifically, the photo-alignment apparatus further comprises a filter 5, disposed between the light source 2 and the polarizing element 3, and below the light source 2 for adjusting the wavelength of the non-polarized light emitted from the light source 2.

Specifically, the non-polarized light emitted from the light source 2 has a wavelength of 200-800 nm.

Preferably, the non-polarized light emitted from the light source 2 is UV light.

Step S2: placing a liquid crystal (LC) panel 4 to be aligned on a side of the loading platform facing the light source.

Step S3: moving the polarizing element 3 to a region below the light source 2 or otherwise in accordance with the display mode of the LC panel 4, and performing photo-alignment on the LC panel 4 to be aligned.

Specifically, Step S3 comprises: when the LC panel 4 to be aligned uses display mode of horizontal alignment, moving the polarizing element 3 to below the light source 2, and performing photo-alignment to the LC panel 4 to be aligned;

when the LC panel 4 to be aligned uses display mode of vertical alignment, moving the polarizing element 3 to a region outside of below the light source 2, and performing photo-alignment to the LC panel 4 to be aligned.

It should be noted that, in the aforementioned photo-alignment method of the present invention, a movable polarizing element 3 is disposed between the loading platform 1 and the light source 2; when the LC panel 4 to be aligned uses display mode of vertical alignment for the LC molecules, such as, PSVA, moving the polarizing element 3 to a region outside of below the light source 2, so that the non-polarized light emitted from the light source 2 irradiating directly on the LC panel 4 to be aligned to perform vertical alignment; when the LC panel 4 to be aligned uses display mode of horizontal alignment for LC molecules, such as, IPS or FFS, moving the polarizing element 3 to below the light source 2 to convert non-polarized light emitted from the light source 2 into linearly polarized light to irradiate on the LC panel 4 to be aligned to perform horizontal alignment. As such, the present invention can be applied to horizontal alignment and vertical alignment respectively, improve the usability of the photo-alignment apparatus, reduce the manufacturing cost, save space and reduce management load.

Specifically, when performing photo-alignment on the LC panel 4 to be aligned, the loading platform 1 can move the LC panel 4 to be aligned horizontally for a complete alignment of the LC molecules. The loading platform moves at a speed in accordance with the amount of light emitted from the light source 2.

Specifically, when performing photo-alignment on the LC panel 4 to be aligned, the loading platform 1 can perform heating to the LC panel 4 to be aligned, with the temperature between 25° C.-60° C., to accelerate the photo-alignment efficiency.

In summary, in the photo-alignment apparatus of the present invention, a movable polarizing element is disposed between the loading platform and the light source; when the LC panel to be aligned uses display mode of horizontal alignment, moving the polarizing element to below the light source to convert non-polarized light emitted from the light source into linearly polarized light to irradiate on the LC panel to be aligned to perform alignment; when the LC panel to be aligned uses display mode of vertical alignment, moving the polarizing element to a region outside of below the light source, so that the non-polarized light emitted from the light source irradiating on the LC panel to be aligned to perform alignment. As such, the present invention can be applied to horizontal alignment and vertical alignment respectively, improve the usability of the photo-alignment apparatus, reduce the manufacturing cost, save space and reduce management load. The present invention also provides a photo-alignment method, able to perform horizontal alignment and vertical alignment during an LCD alignment process, improve the usability of the photo-alignment apparatus, reduce the manufacturing cost, save space and reduce management load.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claim of the present invention.

What is claimed is:

1. A photo-alignment apparatus, comprising: a loading platform, a light source located above the loading platform, and a movable polarizing element located between the loading platform and the light source; a side of the loading platform facing the light source being for placing a liquid crystal (LC) panel to be aligned;

the polarizing element being movable to a region below the light source or otherwise in accordance with the display mode of the LC panel, and being for converting the non-polarized light emitted from the light source into linearly polarized light when moving to a region below the light source;

wherein the light source emits light that travels in a fixed direction toward the loading platform and the loading platform is located directly below the light source in the fixed direction and wherein the polarizing element is movable between a first position where polarizing element is in the region below the light source and is located between the light source and the loading platform in the fixed direction to allow the light emitting from the light source and traveling in the fixed direction to pass through the polarizing element and a second position where the polarizing element is located in a region other than the region below the light source to allow the light emitting from the light source and traveling in the fixed direction to bypass the polarizing element and reach the loading platform directly, wherein the polarizing element is movable between the first position as being located below the light source and the second position as being not located below the light source.

2. The photo-alignment apparatus as claimed in claim 1, wherein the polarizing element comprises a plurality of stacked glass plates, normal direction of the glass plates forms a Brewster angle with propagation direction of the non-polarized light emitted from the light source.

3. The photo-alignment apparatus as claimed in claim 2, wherein the number of glass plates is between three and ten.

4. The photo-alignment apparatus as claimed in claim 1, wherein the photo-alignment apparatus further comprises a filter, disposed between the light source and the polarizing element, and below the light source.

5. The photo-alignment apparatus as claimed in claim 1, wherein the non-polarized light emitted from the light source has a wavelength of 200-800 nm.

6. A photo-alignment method, comprising the steps of:
Step S1: providing a photo-alignment apparatus, the photo-alignment apparatus comprising: a loading platform, a light source located above the loading platform, and a movable polarizing element located between the loading platform and the light source;
Step S2: placing a liquid crystal (LC) panel to be aligned on a side of the loading platform facing the light source;
Step S3: moving the polarizing element to a region below the light source or otherwise in accordance with the display mode of the LC panel, and performing photo-alignment on the LC panel to be aligned;
wherein the light source emits light that travels in a fixed direction toward the loading platform and the loading platform is located directly below the light source in the fixed direction and wherein the polarizing element is movable between a first position where polarizing element is in the region below the light source and is located between the light source and the loading platform in the fixed direction to allow the light emitting from the light source and traveling in the fixed direction to pass through the polarizing element and a second position where the polarizing element is located in a region other than the region below the light source to allow the light emitting from the light source and traveling in the fixed direction to bypass the polarizing element and reach the loading platform directly, wherein the polarizing element is movable between the first position as being located below the light source and the second position as being not located below the light source.

7. The photo-alignment method as claimed in claim 6, wherein Step S3 comprises:
when the LC panel to be aligned uses display mode of horizontal alignment, moving the polarizing element to below the light source, and performing photo-alignment to the LC panel to be aligned;
when the LC panel to be aligned uses display mode of vertical alignment, moving the polarizing element to a region outside of below the light source, and performing photo-alignment to the LC panel to be aligned.

8. The photo-alignment method as claimed in claim 6, wherein the polarizing element comprises a plurality of stacked glass plates, normal direction of the glass plates forms a Brewster angle with propagation direction of the non-polarized light emitted from the light source.

9. The photo-alignment method as claimed in claim 8, wherein the number of glass plates is between three and ten.

10. The photo-alignment method as claimed in claim 6, wherein the photo-alignment apparatus further comprises a filter, disposed between the light source and the polarizing element, and below the light source; and the non-polarized light emitted from the light source has a wavelength of 200-800 nm.

11. A photo-alignment apparatus, comprising: a loading platform, a light source located above the loading platform, and a movable polarizing element located between the loading platform and the light source; a side of the loading platform facing the light source being for placing a liquid crystal (LC) panel to be aligned;
the polarizing element being movable to a region below the light source or otherwise in accordance with the display mode of the LC panel, and being for converting the non-polarized light emitted from the light source into linearly polarized light when moving to a region below the light source;
wherein the polarizing element comprises a plurality of stacked glass plates, normal direction of the glass plates forming a Brewster angle with propagation direction of the non-polarized light emitted from the light source;
wherein a filter is disposed between the light source and the polarizing element, and below the light source; and
wherein the light source emits light that travels in a fixed direction toward the loading platform and the loading platform is located directly below the light source in the fixed direction and wherein the polarizing element is movable between a first position where polarizing element is in the region below the light source and is located between the light source and the loading platform in the fixed direction to allow the light emitting from the light source and traveling in the fixed direction to pass through the polarizing element and a second position where the polarizing element is located in a region other than the region below the light source to allow the light emitting from the light source and traveling in the fixed direction to bypass the polarizing element and reach the loading platform directly, wherein the polarizing element is movable between the first position as being located below the light source and the second position as being not located below the light source.

12. The photo-alignment apparatus as claimed in claim 11, wherein the number of glass plates is between three and ten.

13. The photo-alignment apparatus as claimed in claim 11, wherein the non-polarized light emitted from the light source has a wavelength of 200-800 nm.

* * * * *